June 27, 1967 H. M. RATHBUN ETAL 3,328,763

ELECTRONIC DESK-TYPE COMPUTER

Filed Oct. 1, 1963

5 Sheets-Sheet 1

INVENTORS
MARK PIVOVONSKY
HOWARD M. RATHBUN
BY Charles L. Johnson Jr.
ATTORNEY

INVENTORS
MARK PIVOVONSKY
HOWARD M. RATHBUN
BY Charles L. Johnson Jr.
ATTORNEY

ELECTRONIC DESK-TYPE COMPUTER

Filed Oct. 1, 1963 5 Sheets-Sheet 5

INVENTORS
MARK PIVOVONSKY
HOWARD M. RATHBUN
BY
Charles L. Johnson Jr.
ATTORNEY

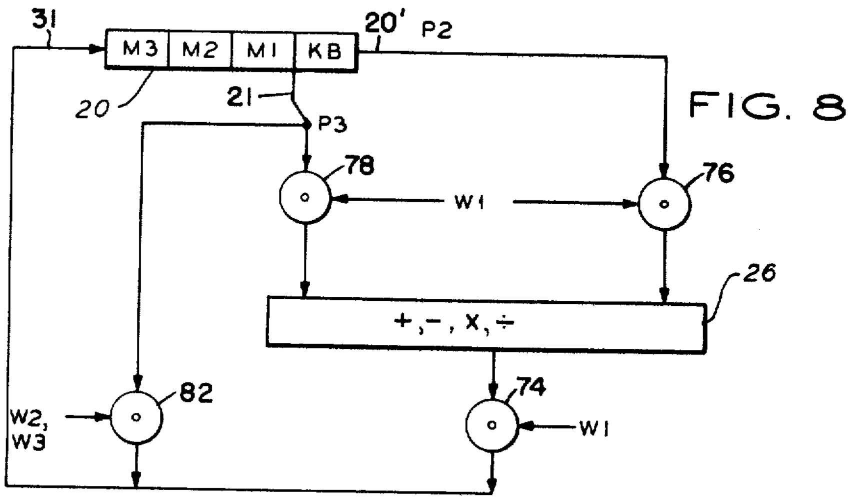
FIG. 8
FIG. 9
| | | | P3 | P2 |
|---|---|---|---|---|
| W1 | M3 | M2 | M1 | KB |
| W2 | R | M3 | M2 | M1 |
| W3 | M2 | R | M3 | M2 |
| W4 | M3 | M2 | R | M3 |
| W1 | O | M3 | M2 | R |
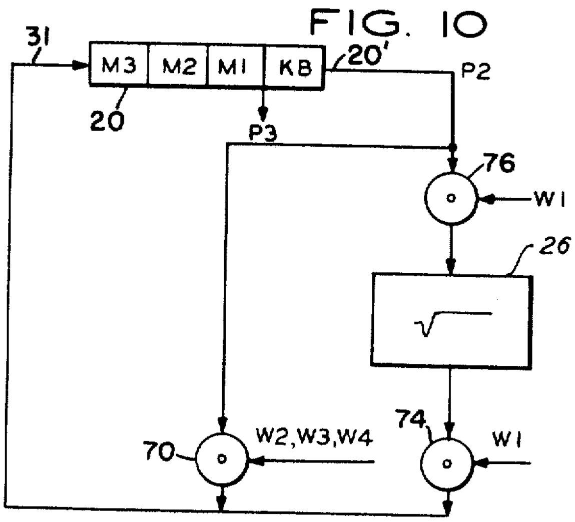
FIG. 10
FIG. 11
| | | | | P2 |
|---|---|---|---|---|
| W1 | M3 | M2 | M1 | KB |
| W2 | √KB | M3 | M2 | M1 |
| W3 | M1 | √KB | M3 | M2 |
| W4 | M2 | M1 | √KB | M3 |
| W1 | M3 | M2 | M1 | √KB |
INVENTORS
MARK PIVOVONSKY
HOWARD M. RATHBUN
BY
Charles L. Johnson Jr.
ATTORNEY June 27, 1967 H. M. RATHBUN ETAL 3,328,763
ELECTRONIC DESK-TYPE COMPUTER
Filed Oct. 1, 1963
5 Sheets-Sheet 5
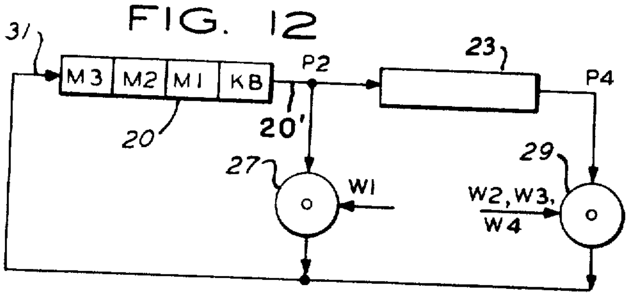
FIG. 12
FIG. 13
| | | | | | P2 | P4 |
|---|---|---|---|---|---|---|
| W1 | M3 | M2 | M1 | KB | O |
| W2 | KB | M3 | M2 | M1 | KB |
| W3 | KB | KB | M3 | M2 | M1 |
| W4 | M1 | KB | KB | M3 | M2 |
| W1 | M2 | M1 | KB | KB | M3 |
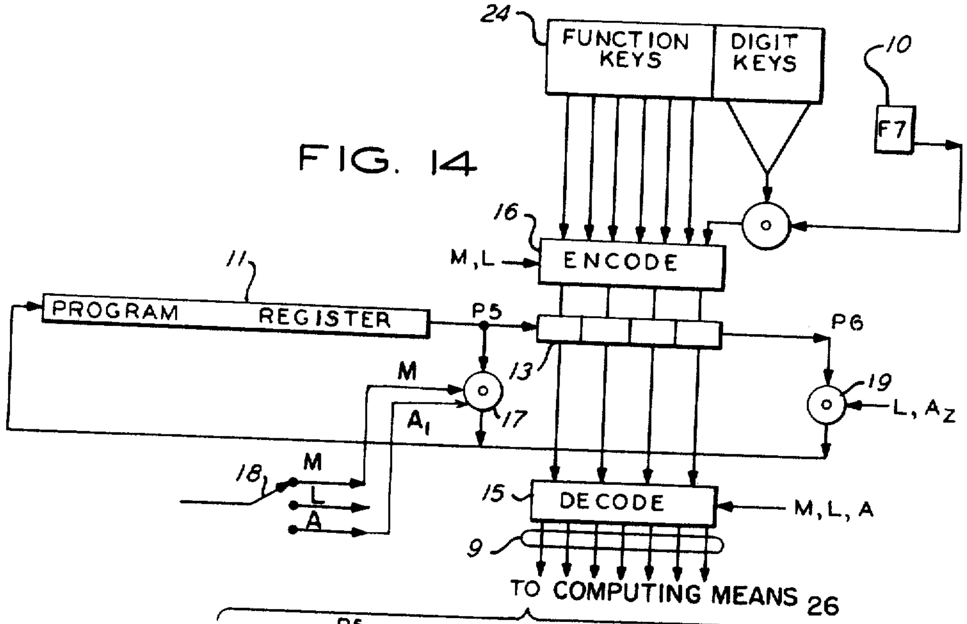
FIG. 14
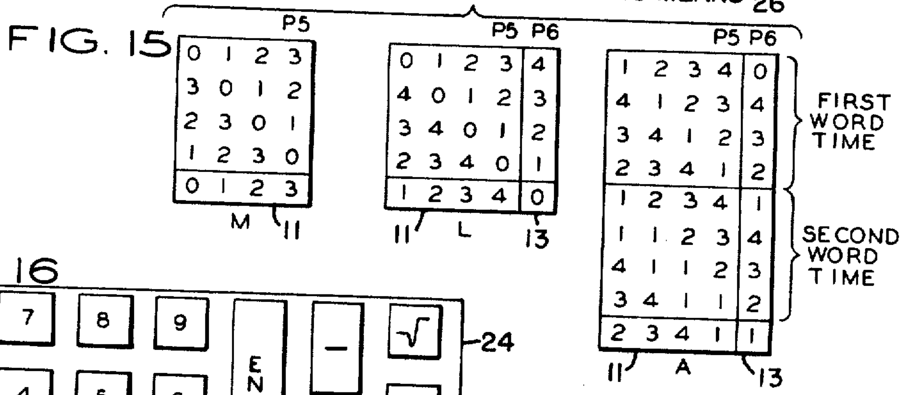
FIG. 15
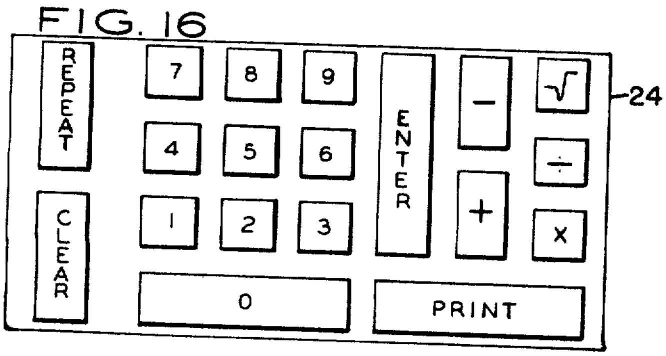
FIG. 16
INVENTORS
MARK PIVOVONSKY
HOWARD M. RATHBUN
BY Charles L. Johnson Jr.
ATTORNEY 3,328,763

ELECTRONIC DESK-TYPE COMPUTER

Howard M. Rathbun, Verona, N.J., and Mark Pivovonsky, New York, N.Y., assignors to Monroe International, Inc., a corporation of New York Filed Oct. 1, 1963, Ser. No. 312,911
18 Claims. (Cl. 340—172.5)

This invention relates generally to computers and more particularly to electronic desk type computers.

Calculating machines have passed through many evolutionary phases in acquiring the form and operational ability they now possess. The complexity of the mechanical array necessary to provide machines capable of performing complex mathematical calculations rapidly, and the desire to perform mathematical calculations without continually monitoring intermediate results, has generated a need for a physically compact rapidly operating computer by which an operator may perform mathematical calculations without referring to or re-entering the intermediate results which occur during the calculation.

Another desire is to repeatedly perform the same mathematical calculation with different numbers as input data without the time consuming preparation beforehand of, for instance, a program or plugboard, that has been required of prior art equipment. It is to the satisfaction of these needs that the present invention is directed.

It is therefore an object of this invention to provide an improved computer.

It is another object of this invention to provide a computer for performing complex mathematical calculations without manual re-entering of the values of the intermediate results or subtotals, without manual specification of the registers where such intermediate results can be found, and without the need for providing the calculating apparatus with a program of operations before actual calculations can be started.

It is still another object of the invention to provide a computer which can repeatedly perform the same calculation on different data or sets of data without any beforehand preparation of programs, plugboard or the like.

It is another object of the invention to provide an electronic computer of simplified physical arrangement.

One feature of the invention is that two numerical quantities which are to interact in a mathematical calculation, are both entered into the computer prior to activation of the mathematical function key which dictates whether addition, subtraction, multiplication or division shall be performed.

Another feature of the invention is the fact that the method and apparatus described shifts numbers so as to act, upon the activation of a function key, either upon the last two numbers entered, upon the last number and a previous intermediate result, upon the last result and a previously entered number, or upon the last two intermediate results wherein neither the operator nor the computer is required to distinguish between entered numbers and intermediate results. In this way an operator is not required to manually re-enter intermediate results in a complex calculation, such results being temporarily shifted out of the way and brought back later to be combined with other intermediate results or with another entered number.

It is another object of this invention to provide a computer wherein during the manual operation of such a computer according to a predetermined program in a first cycle of operation, said program is stored whereby upon subsequent cycles of operation said computer performs according to said program upon numbers subsequently entered, numbers previously stored as intermediate results or the combination of one or more previously stored intermediate results and such numbers subsequently entered.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

Figure 5:
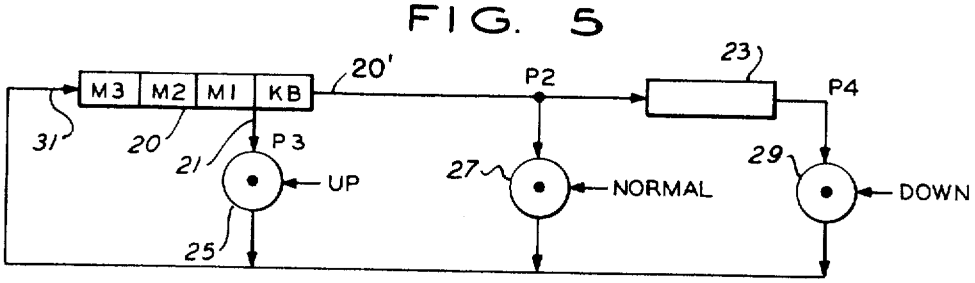
FIG. 5 illustrates the apparatus for shifting the relative positions of the contents of the memory registers.
Figure 6A:
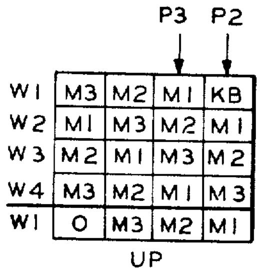

FIG. 6*a* tabulates the operation of the apparatus of FIG. 5, in the up shift mode.

Figure 6B:
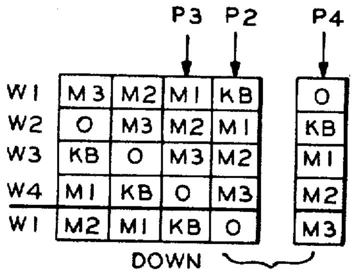

FIG. 6*b* tabulates the operation of the apparatus of FIG. 5, in the down shift mode.

Figure 6C:
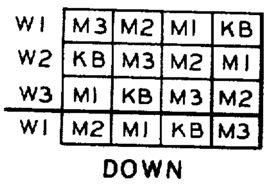

FIG. 6*c* tabulates an alternate method of operation of the apparatus of FIG. 5.

Figure 7:
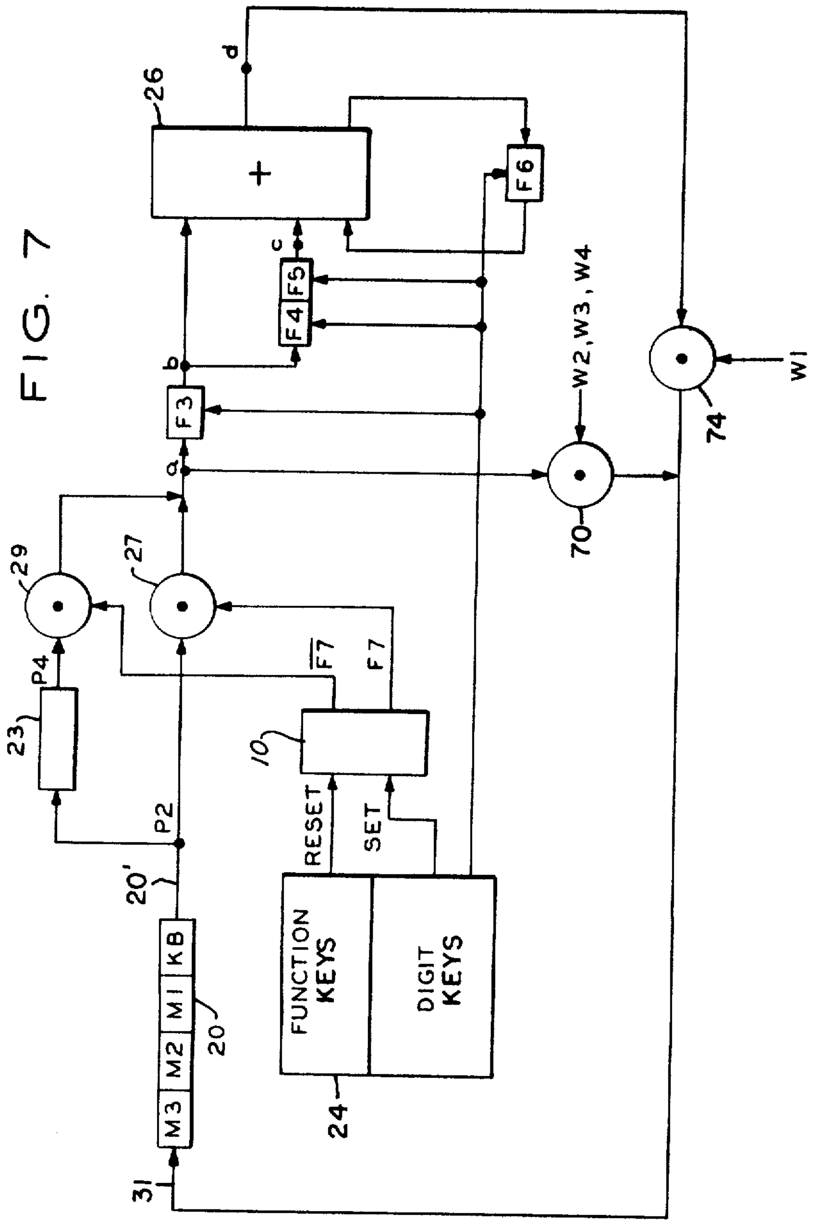

FIG. 7 illustrates the apparatus for converting the keyboard digits to binary form.

FIGS. 8 and 9 illustrate the operation of the apparatus and tabulate the contents of the memory registers during the add, subtract, multiply, and divide operations.

FIGS. 10 and 11 illustrate the operation of the apparatus and tabulate the contents of the memory registers during the square root operation.

FIGS. 12 and 13 illustrate the operation of the apparatus and tabulate the contents of the memory registers during the repeat operation.

FIGS. 14 and 15 illustrate the operation of the automatic program apparatus.

FIG. 16 is a typical keyboard.

The invention, in a preferred embodiment utlizes a calculator keyboard to enter quantities into a delay line storage having a plurality of word positions or memory registers, the quantities being shiftable between word positions in the delay line storage. Apparatus is provided for transferring qoantities into and out of the delay line storage in accordance with keyboard controls so as to perform a plurality of mathematic calculations without keyboard reentry of intermediate quantities or subtotals.

The following description is directed to a preferred embodiment of the eletcronic computer in which a last-in-first out memory is used in response to manual activation of digit and function keys.

Figure 1:
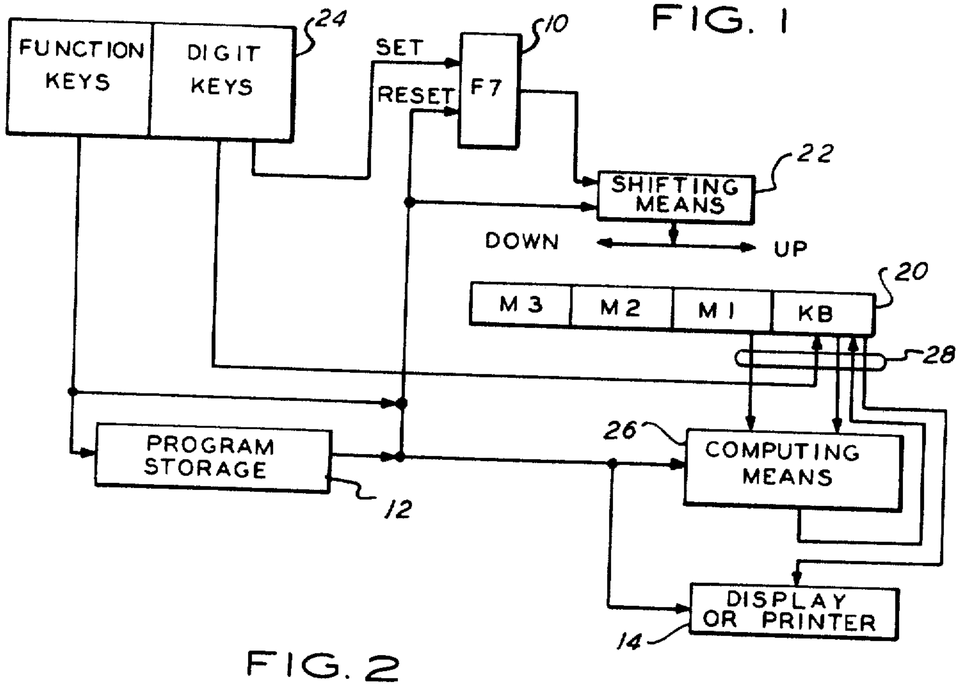
FIG. 1 is a block diagram of the electronic computer.

The block diagram of FIG. 1 illustrates the basic elements of the invention. A storage means 20 is provided for receiving numbers from either the keying means 24 or the computing means 26. A shifting means 22 acts to shift or relatively align the stored numbers, in the storage means 20, with the conductors 28. Numbers are thus arranged in such a manner that the last number entered into storage means 20 is the first number out and the storage means 20 is thus known as a "last-in-first-out storage" or "push-down stack." The keying means 24 include manually operated digit keys for the entering of numbers into storage means 20 in any sequence desired by the operator, and manually operated function keys for controlling the shift means 22 and the computing means 26. The computing means 26 is operatively connected with the storage means 20 and keying means 24 for performing calculations such as for instance add, subtract, multiply, and divide on the stored numbers in accordance with the selected function keys. A flip-flop 10 is provided which controls the shifting means 22 during the entry of numbers.

Associated with the function keys is a program storage 12 which can be used to remember the sequence of function keys used during the solution of a problem and then when the same problem is to be solved again using different numbers as input data, it can be used instead of the function keys to control the operation of the computer thereby achieving much simpler and quicker operation from the standpoint of the human operator. A display or printing means 14 is provided for outputting the answers to the problem.

Figures 2, 3:
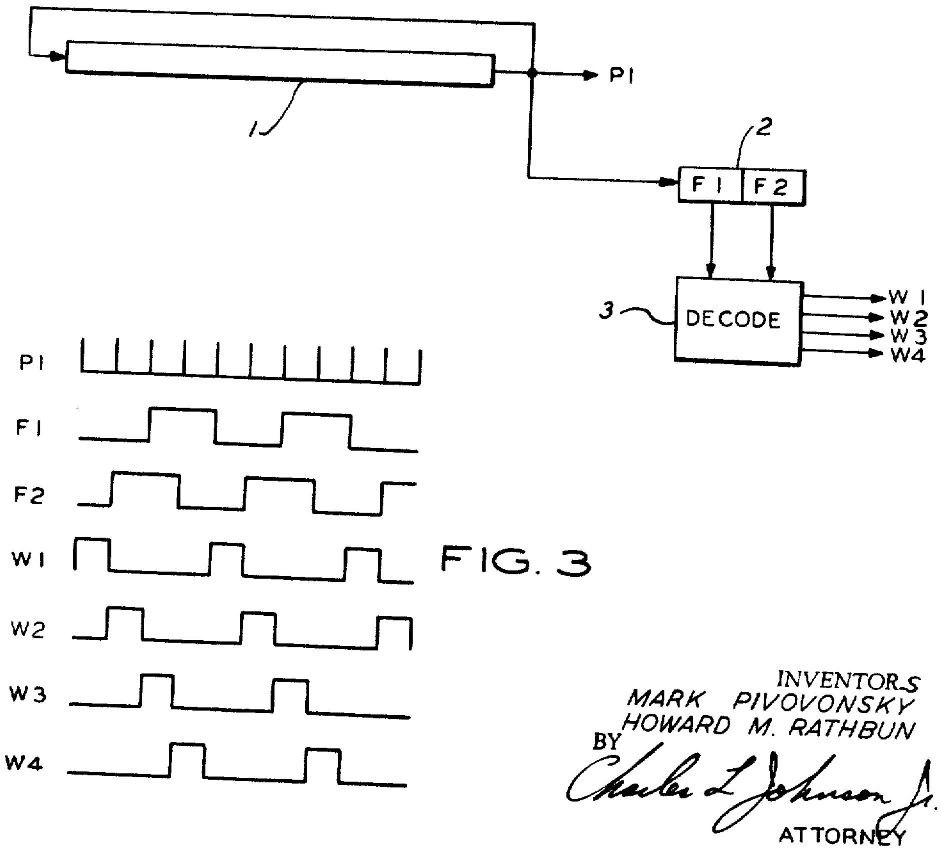
FIG. 2 is a schematic representation of the word counting mechanism.
FIG. 3 illustrates the various word time pulses.

Referring to FIG. 2 the word counting mechanism is seen to consist of a recirculating delay line 1, 224 bits long, two flip-flops 2 and a decoding matrix 3. Delay line 1 is designated as the word time line and contains four equally spaced 1's bits which divide the line into quarters. The time interval betwen these pulses (P1) is defined as one word time. The line 1 is thus four words long.

The words are individually identified by four word time identification pulses W1, W2, W3 and W4 produced by the decode matrix 3. The decode matrix 3, which may be constructed of diodes, resistors or the like in a manner well known in the art, decodes the outputs of the flip-flops F1 and F2 of counter 2, arranged to count according to the Gray-Code. The relationship between the P1 pulses, the outputs of the flip-flops F1 and F2 of counter 2 and the word time identification pulses W1, W2, W3 and W4 are shown in FIGURE 3.

Turning briefly to FIGURE 3, it can be seen that the first P1 pulse or the P1–1 pulse resets flip-flops F1 and F2 to their zero states and their zero outputs are decoded by decode matrix 3 to produce the W1 pulse. The W1 pulse will remain until the arival of the P1–2 pulse sets flip-flop F2 to its one state at which time the W1 pulse is terminated. The zero state output of flip-flop F1 togeher with the one state output of flip-flop F2 is decoded by decode matrix 3 to produce the pulse W2. It should be understood that the waveforms shown are highly idealized and it is assumed that no delay exists between the arival of the pulses P1 at the counter 2 and the production of the pulses W1, W2, W3 and W4 by the decode matrix 3. The pulses W1, W2 ,W3 and W4 will be available in repetitive order as shown by the W1, W2, W3 and W4 lines of FIG. 3.

Figure 4:
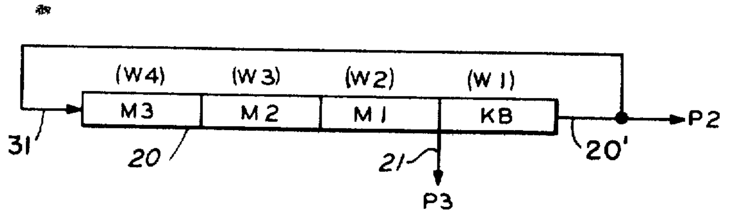
FIG. 4 is a schematic representation of the number storage mechanism.

Referring now to FIG. 4, the number storage is seen to consist of a recirculating delay line 20, which is capable of storing 224 bits. The storage capacity of the delay line 20 is divided into four 56 bit word storage positions KB, M1, M2 and M3 for storing words W1, W2, W3 and W4 respectively. The contents of the delay line 20 may be read out at a playback or output end terminal 20′ or at a further readout tap 21. The tap 21 is located at a point 56 bit positions from the playback or output terminal 20′. The signals available at the terminal 20′ are designated the P2 signals whereas the signals available at the tap 21 are designated the P3 signals and are available 1 word time early with respect to the availability of the P2 signals.

The four word storage positions KB, M1, M2 and M3 of the delay line 20 represent respectively the keyboard register (KB), the memory #1 register (M1) the memory #2 register (M2) and the memory #3 register (M3). These four registers comprise the registers of the last-in-first-out storage means 20, otherwise referred to as the push-down stack.

FIG. 5 shows the mechanism used for shifting the numbers within the delay line storage means 20. Normal circulation of the delay line storage means 20, that is preserving the established relationship between the contents of the delay line 20 takes place via output terminal 20′ of the delay line 20, the And gate 27 to the input 31 of the delay line 20. The And gate 27 is operated by the NORMAL signal (which may be the F7 output of flip-flop F7, 10 of FIG. 7 or the word time pulses W1 to W4) for four word times. When it is desired to shift the numbers in the UP direction, that is in the direction which removes numbers from the line, the information P3 is taken from the delay line storage means 20 at the tap 21 and sent to the input 31 to the delay line storage means 20 via And gate 25. And gate 25 is opened for three word times (W1, W2, and W3) by the UP signal (which may be the word time pulses W1 to W4) applied thereto and then zeros are sent to the delay line storage means 20 for the fourth word time (W4). The UP table in FIG. 6*a* illustrates this operation. The table shows the contents of the four sections of the delay line 20 at the various word times. Comparison of the top and bottom lines (W1) of the table shows that the contents of the registers have been shifted one word time toward the KB end of the delay line 20 after four word times. That is, the initial contents of the M3 register end up in the M2 register, and so forth. The columns headed P2 and P3 show the information that appears on lines P2 and P3 during the indicated word times.

When it is desired to shift the numbers in the DOWN direction, that is in the direction which moves numbers toward the M3 end of the delay line storage means 20, the information P2 is sent to a one word length delay line register 23, the output of which, is designated information P4 is sent to And gate 29 and thence to the input 31 to the delay line storage means 20. The And gate 29 is operated by the DOWN signal (which may be the F7 signal of flip-flop F7, 10 of FIG. 7 or the word time pulses W1 to W4) for three word times. Zeros are entered into the word register KB. The DOWN table in FIG. 6*a* illustrates this operation. The top and bottom lines W1 illustrate the contents of the delay line 20 before the DOWN shift begins and the contents of the delay line 20 when the DOWN shift is complete. The separate blocks indicate the contents of the one word delay line storage 23. The legends P2, P3 and P4 indicate the outputs available at the outputs 20′, 21 and at the output of delay line 23 respectively.

It should be understood that there are many ways to shift the numbers UP and DOWN, any of which may be used in carrying out the invention. An alternate method for shifting DOWN would be, for example, to cause the word counter 2 of FIG. 2 to skip a count while the delay line storage means 20 circulates via the normal regeneration And gate 27 shown in FIG. 5. A DOWN table for this method is shown in FIG. 6*c*. As shown in the table the W4 word count has been eliminated as has the delay line storage register 23. The bottom W1 lines of FIGS. 6*b* and 6*c* show the same contents for the W2, W3 and W4 word registers but vary in the contents of the W1 or KB register. In FIG. 6*b*, the W1 register contains all zeros whereas in FIG. 6*c* the M3 contents of the W4 word register has been placed in the W1 word register. The new contents of the W1 or keyboard is now the word register W4 contents register M3. The contents of the W1 register could be cleared, if desired, by clearing the contents of the W4 register before the push-down operation, by clearing the contents of the keyboard register W1 after the operation, or by recording zeros at the tap 21, FIG. 5, during the word time W3 of the operation. Recording at the tap 21 can be effected by constructing the delay line 20 out of two lines, one of which is three words long and contains the M3, M2, and M1 registers and the other of which is the keyboard register.

The operation of the computer is based on a "parenthesis-free" notation. In this system the mathematical expression to be evaluated is rewritten so that the mathematical operator symbol is placed after the two numerical quantities which are to be combined and the two quantities are separated by a suitable symbol, such as a comma. Using this system, the expression $$a+b$$

becomes $$a,\ b+$$

and $$a/b$$

becomes $$a,\ b\div$$

This system allows two quantities to be written down, or entered into the computer, before any decision is made as to how to combine the two quantities. The two quantities can then be combined in any manner available and then treated as a single number which can be used for further calculations. In this manner more complicated expressions can be expressed and evaluated. For instance $$(a+b)(c+d)$$

becomes $$a,\ b+,\ c,\ d+,\ x$$

While the commas shown after the plus signs are not incorrect, their use in that position is not necessary because the plus signs themselves serve to unambiguously separate the resultant quantities, thusly, $$a,\ b+c,\ d+x$$

A computer based on this system of notation is thus one in which numbers are entered into the computer in the same order in which they occur in the mathematical expression while each mathematical operator is entered after the quantity or quantities required by that operator have either been entered or produced as a result of earlier operations.

The operation of the invention can best be understood by means of an example. The following table shows the sequence of function and digit keys necessary to solve a problem and the contents of the various registers at each step of the problem. The problem is:

$$(4\times 12)+(31\times 8)=296$$

or $$4,\ 12\times 31,\ 8\times +=296 \text{ in parenthesis-free notation}$$

| Operation | KB | M1 | M2 | M3 |
|---|---|---|---|---|
| 4 | 4 | 0 | 0 | 0 |
| ENTER | 4 | 0 | 0 | 0 |
| 1 | 1 | 4 | 0 | 0 |
| 2 | 12 | 4 | 0 | 0 |
| X | 48 | 0 | 0 | 0 |
| 3 | 3 | 48 | 0 | 0 |
| 1 | 31 | 48 | 0 | 0 |
| ENTER | 31 | 48 | 0 | 0 |
| 8 | 8 | 31 | 48 | 0 |
| X | 248 | 48 | 0 | 0 |
| + | 296 | 0 | 0 | 0 |
| PRINT | 296 | 0 | 0 | 0 |

It can be seen that the sequence of entry of numbers and instructions into the computer in the above example is identical to the sequence in the problem stated in parenthesis-free notation.

The operations listed above can be viewed with respect to the delay line storage means 20 of FIG. 5 in the following manner. The depression of the digit key representing the digit 4 of keying means 24 (see FIG. 16) causes the entry of the digit into the KB word register of delay line storage means 20, where it remains until a further key is depressed. Since the digit 4 is the entire first quantity to be entered, the enter key of the keying means 24 is depressed. This does not cause the shifting of the quantity 4, already stored in the KB register but prepares the storage means 20 for a DOWN shift. Upon the entry of the highest order digit of the next quantity, the quantity stored in the KB register is DOWN shifted and stored in the M1 register and the tens digit of the second quantity is entered in the KB register. The next digit to be entered is the units order digit of the previously entered quantity and it is desired to enter it into the KB register, so that the value standing in the KB register represents the entire second quality. The function key X or multiply of keying means 24 of FIG. 16 is now depressed causing the quantities stored in the M1 and KB registers to be operated upon in the manner prescribed by the X or multiply function key. The results of the multiplication are then placed in the KB register for further operations. The depression of a further digit key causes the result to be DOWN shifted from the KB register to the M1 register. The operation described above is the same for the entry of the quantity 31 and the depression of the enter key. The depression of the 8 digit key causes the first partial result 48 to be shifted to the M2 register position, the first quantity of the second expression 31 to be shifted to the M1 register position and the second quantity of the second expression 8 to be stored in the KB register position. Upon the depression of the X or multiply function key, the first and second quantities of the second expression are multiplied and the second partial result 248 is entered into the KB register position. The first partial result 48 is UP shifted to the M1 register position. The depression of the + or add function key of keying means 24 of FIG. 16 causes the first and second partial results to be added and the final result 296 placed in the KB register position. This result will be retained in this position and can then be used as one of the quantities of a further operation. In addition, without destroying the contents of the KB register, the depression of the print function key of the keying means 24 will cause the print out of the final result 296. If desired, the KB register may be cleared by use of the clear function key of the keying means 24.

Another example further illustrates the operation of the invention as well as showing the flexibility that is permitted in the solution of a problem.

The problem is:

$$2(3(4+5)+6)+7=73$$

or $$2,\ 3,\ 4,\ 5+\times 6+\times 7+=73$$

| Operation | KB | M1 | M2 | M3 |
|---|---|---|---|---|
| 2 | 2 | 0 | 0 | 0 |
| ENTER | 2 | 0 | 0 | 0 |
| 3 | 3 | 2 | 0 | 0 |
| ENTER | 3 | 2 | 0 | 0 |
| 4 | 4 | 3 | 2 | 0 |
| ENTER | 4 | 3 | 2 | 0 |
| 5 | 5 | 4 | 3 | 2 |
| + | 9 | 3 | 2 | 0 |
| X | 27 | 2 | 0 | 0 |
| 6 | 6 | 27 | 2 | 0 |
| + | 33 | 2 | 0 | 0 |
| X | 66 | 0 | 0 | 0 |
| 7 | 7 | 66 | 0 | 0 |
| + | 73 | 0 | 0 | 0 |
| PRINT | 73 | 0 | 0 | 0 |

However the problem may also be solved by working from the "inside out." To do this, the problem is rewritten:

$$4,\ 5+3\times 6+2\times 7+=73$$

| Operation | KB | M1 | M2 | M3 |
|---|---|---|---|---|
| 4 | 4 | 0 | 0 | 0 |
| ENTER | 4 | 0 | 0 | 0 |
| 5 | 5 | 4 | 0 | 0 |
| + | 9 | 0 | 0 | 0 |
| 3 | 3 | 9 | 0 | 0 |
| X | 27 | 0 | 0 | 0 |
| 6 | 6 | 27 | 0 | 0 |
| + | 33 | 0 | 0 | 0 |
| 2 | 2 | 33 | 0 | 0 |
| X | 66 | 0 | 0 | 0 |
| 7 | 7 | 66 | 0 | 0 |
| + | 73 | 0 | 0 | 0 |
| PRINT | 73 | 0 | 0 | 0 |

This problem, when solved the second way, required only two registers of the delay line storage means 20 whereas the first required four. Thus it is often possible to rewrite the problem in a manner which will require fewer registers. This may be necessary if the problem, as given, requires more registers than available for solution by the first method. For instance, $$8(2(3(4+5)+6)+7)=584$$

must be rewritten if it is to be solved on a computer with only four registers. For example, $$4,\ 5+3\times 6+2\times 7+8\times =584$$

A further more complicated problem illustrates the use of additional keys. The problem is:

$$\frac{48-\sqrt{7^2+\frac{45}{3}}}{20}=2$$

or $$48,\ 7,\ 7\times 45,\ 3\div+\sqrt{\quad}-20\div=2$$

| Operation | KB | M1 | M2 | M3 |
|---|---|---|---|---|
| 4 | 4 | 0 | 0 | 0 |
| 8 | 48 | 0 | 0 | 0 |
| ENTER | 48 | 0 | 0 | 0 |
| 7 | 7 | 48 | 0 | 0 |
| REPEAT | 7 | 7 | 48 | 0 |
| × | 49 | 48 | 0 | 0 |
| 4 | 4 | 49 | 48 | 0 |
| 5 | 45 | 49 | 48 | 0 |
| ENTER | 45 | 49 | 48 | 0 |
| 3 | 3 | 45 | 49 | 48 |
| ÷ | 15 | 49 | 48 | 0 |
| + | 64 | 48 | 0 | 0 |
| $\sqrt{\quad}$ | 8 | 48 | 0 | 0 |
| − | 40 | 0 | 0 | 0 |
| 2 | 2 | 40 | 0 | 0 |
| 0 | 20 | 40 | 0 | 0 |
| ÷ | 2 | 0 | 0 | 0 |
| PRINT | 2 | 0 | 0 | 0 |

The use of the REPEAT key in step #5 obviates the entry of a second 7.

The preferred embodiment of the invention provides for a keying means 24 as shown in FIG. 16 including nine function keys which may be designated enter, add, subtract, multiply, divide, square root, repeat, clear, and print. In addition, there are ten digit keys for entering the digits 0 to 9. Obviously this number and these functions may be varied by altering the number of keys used or the functions they perform, without departing from the spirit of the invention.

The basic rules for the operation of the computer are as follows:

Numbers are entered from the digit keys of the keying means 24 into the keyboard storage register KB of the delay line storage means 20. As the first digit of a number is entered, any previously stored contents of the delay line storage means 20 or push-down stack are pushed down. That is, the contents of register position M2 are transferred to register position M3 and the contents of register position M3 are lost (note FIGURES 6*b* and 6*c*), the contents of register position M1 are transferred to register position M2, the contents of the register position KB are transferred to register position M1, and the contents of register position KB are set to zero. The first digit, which initiated this process, is now stored in the cleared keyboard register KB. Succeeding digits of the same number are entered and combined in the proper manner with the contents of the keyboard register KB.

The enter key is used to indicate the separation of two distinct quantities which are to be entered in to the computer. After the first complete number is entered as described earlier, the enter key is depressed. This indicates that the next digit to be entered is the first digit of a second number and not another digit of the preceding number. This next digit then causes the DOWN shift of the delay line storage means 20 and the second number to be entered in the same manner as the first.

When a function key such as add or subtract is depressed the numbers in the M1 and KB registers are combined according to the indicated function key, the result is placed in the keyboard register KB, the contents of register position M2 are transferred to register position M1, the contents of register position M3 are transferred to register position M2, and the contents of register position M3 are then cleared.

When a function key such as the square root key is depressed, the contents of the keyboard register KB is operated upon in accordance with the depressed key and the result is placed in the keyboard register KB. The remaining registers are not affected.

The following is a still more detailed description of the operation of the preferred embodiment according to the rules set forth above.

The operation of the digit entry mechanism varies depending upon whether the entered digit follows another digit of the same number or whether it follows an operation and is shown in FIG. 7. The computer therefore is provided with a flip-flop F7, 10 which is set by the first digit of a number and reset by any operation. If a digit is entered when F7 is reset, indicating the first digit of a number after an operation, and the presence of a stored result in the keyboard register KB, the delay line storage means 20 is pushed down via the one word time delay line register 23, And gate 29 operated by the DOWN or F7 signal from the F7 flip-flop 10 and And gate 70 operated by the word time signals W2, W3 and W4 to input 31 of the delay line storage means 20. Register 23 is initially zero so that during this process, the initial contents of the keyboard register KB are transferred to the M1 register, the keyboard register KB is cleared, and F7 flip-flop 10 is set. The first digit, which initiated this process, is then entered into the keyboard register KB in a manner which will be described subsequently.

If a digit is entered when F7 flip-flop 10 is set, indicating another digit of the same number, the digit is combined with the previous contents of the keyboard register KB without any alterations in the contents of the remaining delay line storage means 20 registers.

The manner in which a digit is entered into the keyboard register KB will now be described. The electronic computer in a preferred embodiment operates internally in binary notation so that the digits entered through the digit keys of the keying means 24 must be converted to binary form. The mechanism for accomplishing this is also illustrated schematically in FIG. 7. The four flip-flops F3, F4, F5, and F6 are preset by the entering digit in a 5211 code wherein the entering digit is represented by a four-bit code whose bits set the flip-flops F3, F4, F5, and F6. The individual flip-flops F3, F4, F5 and F6 will be set to either their one state or zero state in dependence upon the bits of the input code. The weight for each bit position, that is 5, 2, 1, 1, will be derived from the conversion algorithm to be described. During W1 time, the contents of the keyboard register KB, are multiplied by ten and the initial value of F3–F6, which is the incoming digit in 5211 code is added to the result. The result of this conversion is to produce a value in the delay line storage means 20 in binary form. Assuming that the first digit of the number entered into the keyboard register KB is a nine, then the keyboard register KB will store a value of 1001. Further, assuming the second digit of the number is also a nine, then the input digit in 5, 2, 1, 1 code would set each of the flip-flops F3, F4, F5, and F6 to their one states. At a first bit time, the flip-flops F3, F5 and F6 each furnish an input to the computing means 26, referred to as the adder since this is the function it is presently serving, producing a one output at point *d* and setting flip-flop F6 to one as the carry storage flip-flop. At the second bit time, flip-flop F3 is set by the law order one bit of the stored first digit 9(1001), flip-flop F4, stores the one bit formerly stored by flip-flop F3, and flip-flop F5 stores the one bit formerly stored by flip-flop F4. Thus adder 26 receives one input signals from flip-flops F3, F5 and F6 and produces a one output signal at point *d* while setting carry flip-flop F6 to 1.

At the third bit time, the flip-flops are set as follows: flip-flop F3 stores the second order zero of the digit 9 in the keyboard register KB, flip-flop F4 stores the first bit of the digit 9 from the keyboard register KB, a one, flip-flop F5 stores the former contents of flip-flop F4 and flip-flop F6 stores a one carry signal. The adder 26 then produces a zero at point *d* and sets flip-flop F6 to store a one carry signal. At the fourth bit time, flip-flops F5, F4 and F3 store the lowest order, the next highest order and the next highest order of the digit 9 in the keyboard storage register KB and cause the production of a zero output at point $d$ while setting the carry flip-flop F6 to a one. At the fifth time period, flip-flops F3, F4 and F5 store the three highest orders of the digit 9 stored in the keyboard register. The adder 26 thus receives a one input from flip-flops F3 and F6 and a zero input from flip-flop F5, producing a zero output at point $d$ and setting flip-flop F6 to store a one carry signal.

The sixth bit time introduces a stored zero to flip-flop F3, while shifting a one from flip-flop F3 to flip-flop F4. Flip-op F5 receives flip-flop F4's stored zero. The adder 26 receives a one from flip-flop F6 while receiving zero inputs from flip-flops F3 and F5, and produces a one output at point $d$ but fails to set the carry flip-flop F6. In the seventh bit time, flip-flops F3, F4 and F6 are set to zero whereas flip-flop F5 is set to one, the highest order of the stored 9 in the keyboard register KB. As a result, adder 26 produces a one output at point $d$ and again fails to set the flip-flop F6. Since all further bits to the connector from the keyboard register KB are zero, the operation will continue to produce zeros until the end of word period W1. The result now in binary form 1100011 (99) is returned to the input line 31 of the delay line storage means 20 via And gate 74, operated by the W1 word time signal, on a bit by bit basis. This algorithm is summarized as follows:

$$\text{Point } b=2a+F3_0$$
$$\text{Point } c=4(\text{point } b)+2F4_0+F5_0$$
$$=8a+4F3_0+2F4_0+F5_0$$
$$\text{Point } d=\text{Point } b+\text{Point } c+F6_0$$
$$=10a+5F3_0+2F4_0+F5_0+F6_0$$

where the subscript 0 designates the initial value of the flip-flop. Thus the output of the adder 70 at point $d$ is equal to the entering digit if it is the first digit of a number and it is 10 times the contents of the keyboard register plus the entering digit for succeeding digits of the same number. Finally, the flip-flop F7 is only reset at the end of word time four (W4) so that the entire line is shifted in the indicated direction. Additional details of the conversion circuit and technique employed are found in U.S. patent application Ser. No. 413,864, filed Nov. 25, 1964, for a Binary to Decimal Conversion Method and Apparatus by Rathbun et al. and assigned to the assignee of the instant invention.

The function keys of add, subtract, multiply, and divide, cause the contents of the KB and M1 registers to be used as the two operands for the indicated arithmetic operation and the remainder of the delay line storage means 20 or stack is pushed up by gating the early tap 21 (signal P3) to the input 31 of delay line storage means 20 causing the result to be placed in the keyboard register KB. The mechanism for accomplishing this is illustrated schematically in FIG. 8. FIG. 9 shows the contents of the various registers of line 20 at the various word times.

Considering FIGS. 8 and 9 the mode of operation of the Computer for the add, subtract, multiply and divide operations is set forth in greater detail. At word time W1 the And gate 76 is operated to admit the first operand as information pulses P2 from the keyboard register KB via the output tap 20′ of the delay line storage means 20 to the computing means 26, lowest order, bit first. At the same time, the word time pulse W1 operates the And gate 78 to admit the contents of the register M1, the second operand, to the computing means 26. These signals at the one word early tape 21 and identified as the information signals P3 are also admitted lowest order, bit first. This is shown in line W1 of the table of FIG. 9, where the contents of keyboard register KB appear as the P2 signals, and the contents of the M1 register appear as the P3 signals. Line W1 of FIG. 9 shows the contents of the registers at the start of word time W1.

The results of the operation R are gated by And gate 74 operated by word time pulse W1 to place them in the M3 register position of the delay line storage means 20. This is shown in the second or W2 line of the table of FIG. 9. Since the reading out of a word at the tap 21 does not interfere with the progression of the words within the delay line storage means 20, the contents of the register M1 is also advanced to the keyboard register KB. The line W2 indicates the contents of the various registers at the time the W2 time pulse is applied.

The W2 word time pulse is applied to And gate 82 to cause the pushing up of the delay line storage means 20 such that the contents of the M2 register, now in the M1 register position, is advanced to the keyboard register position KB as well as the M3 register position. The result of the operation R is advanced to the M2 register position. This is shown in the W3 line of the table of FIG. 9. The word time pulse W3 also operates the And gate 82 to gate the contents of the M1 register, now containing the M3 word, to the M3 register position. In addition, the M3 word is shifted into the keyboard register KB. The result R is shifted to the M1 register position. This is shown in line W4 of the table of FIG. 9. The W4 word time pulse causes the result R to be shifted to the keyboard register position KB to be available as an operand for the next computation. The register position M3 contains all zeros as is usual for a push-up operation. This is shown in the lowest line, W1, of the table of FIG. 9.

The square root operation key (see FIG. 16) causes the square root to be taken of the contents of the keyboard register KB. The result is placed in the keyboard register KB and the remainder of the stack is unaffected. FIG. 10 shows the mechanism for accomplishing this. FIG. 11 shows the contents of the various registers during the operation.

At word time pulse W1, the contents of the keyboard register KB of the delay line storage means 20 is read out at output 20′ to the And gate 76 and the And gate 70. The W1 word time pulse operates And gate 76 to pass the contents of the KB register to the computing means 26. The And gate 70 is inoperative at this time due to the absence of word time pulses W2, W3 or W4. After computing the square root of the contents of the keyboard register KB, the resultant indicated as $\sqrt{KB}$ is passed via And gate 74, also operated by word time pulse W1, to the M3 register position of the delay line storage means 20 via input 31. At the beginning of word time W2, the registers contain the values shown in line W2 of FIG. 11. During word time W2 the contents of register M1, that is M2 will be shifted into the keyboard register position KB as well as gated via And gate 70, gated by word time pulse W2 to register position M3. The contents of register positions M3 and M2 are pushed up so that $\sqrt{KB}$ appears in register position M2 at the start of word time W3.

During word time W3, the push-up operation continues via And gate 70, operated by word time pulse W3 and the normal progression through the delay line storage means 20, so that at the start of the W4 word time the register of the line 20 appears as at line W4 of the table of FIG. 11. The word time pulse W4 causes the further UP shift of the line 20 until the register contents of the line 20 appears as at the bottom line W1 of the table of FIG. 11. The result $\sqrt{KB}$ is now in the keyboard register KB, available as an operand in a further operation while the remaining registers M1, M2 and M3 are undisturbed.

The repeat control key causes the apparatus of FIG. 12 to operate. In the repeat operation, the contents of the keyboard register KB is also entered into the register position M1, the contents of the register positions M1 and M2 are DOWN shifted to register positions M2 and M3 respectively. The contents of the M3 register position is placed in the one word storage means 23 where it may temporarily be retained or destroyed. As may be seen from the table of FIG. 13 and the schematic diagram of FIG. 12, the W1 word time pulse operates And gate 27 to cause the storage of the keyboard register KB contents in the M3 register position via input 31 at the same time as the contents of KB is transferred to the one word delay line storage means 23. At word time, pulse W2 the value of KB, stored therein is transferred to the M3 register position via input 31. Meanwhile, the entire line has been pushed up so that the KB contents of register position M3 is advanced to register position M2. Now both register positions M2 and M3 each contain the contents originally entered into the keyboard register KB. The push down operation continues during word time pulses W3 and W4 so that at the start of the next W1 word time the former contents of register positions M1 and M2 occupy register positions M2 and M3 respectively. The same operation could be achieved by entering the operand twice.

The clear keyboard control key causes the storage means 20 to shift in the UP direction, that is, towards the keyboard register KB position. The contents of the keyboard register KB is lost and the register positions M1, M2 and M3 are shifted UP to occupy the register positions KB, M1 and M2 respectively. The register position M3 is cleared to all zeros. This operation is shown in the table of FIG. 6*a* taken in comjunction with FIG. 5. The UP signal will be supplied by the word time pulses W1 to W4.

The print control key causes the contents of the keyboard register to be printed or displayed on a suitable device. The keyboard register is not affected and the remaining registers are likewise undisturbed.

The program storage mechanism can best be understood by referring to FIG. 14. The mechanism consists of a one-word program register 11, which is 56 bits long, and a four bit flip-flop register 13. The program register 11, which in the preferred embodiment is of the recirculating type such as a delay line, may recirculate either through And gate 17 or through the four bit register 13 and thence through And gate 19. Each instruction is four bits in length and thus the program register 11, having a capacity of 56 bits, may store a total of 14 four bit instruction characters. Each of the four bit instruction characters can specify one of 16 instructions.

The four bit register 13, in addition to being connected serially to the program register 11, is connected to the encoding matrix 16 and a decoding matrix 15. Finally, a mode switch 18 is used to control the operation of the program storage mechanism. The mode switch has three positions: Manual (M), Load (L), and Automatic (A). When the switch is in the manual position, the function keys of the keying means 24 control the operation of the computer and the program register 11 does not affect or is not affected by the operation of the computer. While in this mode, the depression of a function key operates the encode matrix 16, enabled by the M signal to set an instruction code corresponding to that key into the four bit register 13. The decoding matrix 15 then decodes the contents of register 13 and energizes one of several control lines 9 which in turn control the computer. At the same time, the program register 11 recirculates through And gate 17.

The Tables M, L and A of FIG. 15, illustrate a program register 11 having a 16 binary bit storage capacity and the four bit register 13. This is not intended to limit the program register 11 or the register 13 to any specific size, but is for illustrative purposes. The tables illustrate the characters positions only and each character is intended to be equivalent to a four bit instruction character. The Table M of FIG. 15 illustrates the recirculation of previously stored instruction characters in the program register 11 via the And gate 17. Since the manual operation M does not effect the previously stored contents of the program register 11, the content and location of the program register 11 is the same both before and after recirculation. When it is desired to repeat a sequence of operations, the mode switch 18 is first set to Load. Each function key sets the four bit register 13 as before and the register 13 in turn controls the computer via the decoding matrix 15. However, at the completion of each operation, the program register 11 is connected to the four bit register 13 for one word time via And gate 19 operated by the L signal. This causes the contents of the program register 13 to be shifted toward the high order end of the register 13 by four bits and the contents of the four bit register 13, as the signals P6 to be placed in the low order end of the program register 11. The Table L of FIG. 15 shows the recirculation of the illustrative program register 11 together with the register 13 via the And gate 19 operated by the L signal. The first line of the table shows the storage of four instruction characters 0 to 3 in the program register 11. The instruction character 3 is available at the output of program register 11 as the P5 signal but is not gated back to the program register 11 due to the And gate 17 not receiving its operating signal M. The instruction character 4 is the output of the register 13 as the signal P6 and due to the operation of the And gate 19 by the L signal is joined into the recirculation path including program register 11 and register 13. The remainder of Table L of FIG. 15 shows the circulation of the instructions in the program register 11 and register 13 during subsequent word periods. In the last of the Table L, the register 13 contains a zero instruction character or is empty, ready to receive a further input via the encode matrix 16, enabled by the L signal.

At the completion of the problem, then, the program register 11 will contain a plurality of instruction characters which represent the operational steps used in the solution of the problem. After the problem has been solved once in the Load mode, the mode switch 18 is then set to Automatic or A.

While in the Automatic mode, the contents of the program register 11 are used to control the operation of the computer and the function keys of the keying means 24 are made inoperative. This is done by gating the program register 11 to the four bit register 13 for two word times. During the first word time the highest order four bit instruction character is gated to the four bit register 13 from the program register 11 recirculated via gate 17, in order to position the highest order or first-in instruction character at the right end of the program register 11, and during the second word time the contents of the highest order or first-in instruction character is shifted into the four bit register 13 as well as gated to the program register 11 via And gate 19 thus preserving the contents of the program register 11. To summarize the operation, the process just described causes the high order four bit instruction character, or tetrad, stored in the program register 11 to be placed in the four bit register 13 and the contents of the program register 11 to be cyclically shifted by four bits toward the high order end. Turning now to Table A of FIG. 15, the operations set out above are summarized. The first line of the Table A shows the contents of the program register 11 and register 13 as they were loaded during the load procedure L and as appears as the bottom line of Table L of FIG. 15. During the first word time the contents of the program register 11 are recirculated in four character times (equal to 16 bit times) from the right end of the register via the enabled And gate 17 to the left end of the program register 11. And gate 17 is enabled by the A signal, meaning automatic and occurring during the first word time. If it is assumed that the instruction characters 1 to 4 are numbered in their order of entry with the program register 11, it can be seen that four recirculations take place until the highest order tetrad or first-in instruction character is at the right most position of the program register 11. This is shown at lines 1 to 4 of the Table A of FIG. 15 and labeled first word time. Although the instruction characters are shifted into the register 13 during these recirculation cycles, they do not cause the functioning of the computer. As new instruction characters are shifted into the register 13, the former contents are lost due to the lack of operation of And gate 19, enabled by the A2 signal or automatic signal occurring during word time 2. With the first-in instruction character positioned as shown in the fourth line of the Table A, the second word time begins. The program register 11 is now shifted via register 13 and And gate 19 to the program register 11. The first instruction, 1, is shifted into register 13 and also passed via And gate 17 to the left side of the program register 11. This is shown in line 5 of Table A. The recirculation continues via register 13 and And gate 19 only for the remainder of the 3 character times until the first-in instruction character 1 is located in both register 13 and the highest order or right-most position of program register 11, as is shown in line 9 of Table A. At this point the execution cycle begins with the first-in instruction 1 locked in register 13, uneffected by the recirculation of the program register 11 via And gate 17. After the completion of that operation, the process is repeated and the next instruction character in the program register 11 (#2 in the table shown) is brought into the four bit register 13. In this way, the instruction characters which were stored in the program register 11 during the Load mode, are brought out to the four bit register 13 to control the computer automatically. The instruction characters are brought out in the same order in which they were stored, that is last-in-last-out or first-in-first-out so that the problem solved while in the Automatic mode is the same as the one solved in the Load mode. Furthermore, the problem may be solved many times automatically because the instruction characters are retained in the program register 11 in the process of shifting the instruction characters through the four bit register 13.

Finally, there are two provisions which must be realized in order to have a working system. If the problem requires fewer steps for its solution than the capacity of the program register 11 (14 in the case of the preferred embodiment and 4 for the examples in FIG. 15), the remainder of the program register 11 must be filled with instruction characters which will have no effect upon the operation of the computer. This special instruction character, called a No OP, when appearing as an instruction character in the four bit register 13 will merely cause the program apparatus of FIG. 14 to go through another shift cycle and come up with the next instruction character in sequence. Thus a problem requiring 11 steps of computation will result in a program register 11 containing 11 program steps plus three No OP steps and these three No OP steps will be executed along with the 11 program steps every time the complete problem is solved in the Automatic mode. Naturally problems requiring more than 14 steps cannot be done in the Automatic mode.

The other special provision is required for the digit keys. Every entry of a number into the computer during the Load mode must be noted by the program register 11. This is done by setting a unique code into the four bit register 13 whenever a digit key of the keying means 24 is depressed. This permits this unique code to be stored only for the first digit of a number. When this code later appears in the four bit register 13 during the Automatic mode, the computer sets up to receive the digits of a number. The conclusion of the number is signaled by the depression of the ENTER key which causes the program register 11 to shift to the next stored instruction character.

If, for instance, the problem appearing in the first paragraph of col. 7 had been solved with the mode switch in the Load position, the following problem could be solved in the Automatic mode:

$$\frac{37-\sqrt{9^2+\frac{38}{2}}}{3}=9$$

The steps the human operator would take in solving this problem are:

3
7
ENTER
9
ENTER
3
8
ENTER
2
ENTER
3
ENTER

After the last ENTER, the correct answer "9" would be printed. The program register 11 for this example would contain at the conclusion of the problem the following codes:

| | | | | | | | | | | | | | |
|---|---|---|---|---|---|---|---|---|---|---|---|---|---|
| O | D | D | R | × | D | D | ÷ | + | √‾‾ | − | D | ÷ | P |

Where O is No OP Code
D is Digit Code
R is REPEAT Code
P is PRINT Code and the rest are self-evident.

Considering the execution of the problem at the top of this column which the program shown above stored in the program register 11, stored as a result of the operation on the problem of col. 7 with the computer in the load mode L, the solution proceeds as follows: The program register 11 will go through 14 shift cycles until the O or No OP instruction character is in the register 13. This instruction character will be decoded by the decode matrix enabled by the A or automatic signal and will attempt to operate the computing means 26. However, since this is a No OP instruction character, it will not cause the computing means 26 to operate but will initiate a further recirculation of the program register 11 until the first digit instruction character D is placed in the register 13. This will permit the entry of a digit from the keying means into the keyboard register position KB of the delay line storage means 20. The digit entered is 37, entered by first entering the 3, then the 7 and depressing the enter key on the keying means 24 of FIG. 16. The program register 11 will recirculate until the second digit instruction character D is placed in the register 13. At this time the 9 digit key of the keying means 24 is depressed entering the digit 9 into the keyboard register position KB and shifting the digits 37 to the M1 register position. The program register 11 then recirculates until the R instruction character is placed in register 13. As a result, the contents of the keyboard register position KB is copied into register position M1 and the value 37 formerly stored in register position M1 is shifted to register position M2 of the delay line storage means 20.

The further recirculation of the contents of the program register 11 causes the × or multiply instruction character to be placed in register 13. This causes the contents of the keyboard register position to be multiplied by the contents of the M1 register position and the resultant placed in the keyboard register position while the quantity 37 is shifted up from the M2 register position to the M1 register position of the delay line storage means 20. The next instruction character placed in register 13 from the program register 11 is the third digit instruction character D which calls for the entry of the digits 38 into the keyboard register KB of delay line 20. The next instruction also calls for the entry of a digit from the keying means 24. The digit entered is the digit 2, which results in the storage of the following quantities in the registers of the delay line storage means 20: In the keyboard register KB the digit 2, in the M1 register position 38, in the M2 register position 81 and in the M3 register position 37.

The program register 11, on its next recirculation, introdues the ÷ or divide instruction character into register 13 which causes the division of the quantity 38 in register position M1 by the quantity 2 stored in the keyboard register KB. The result of this division, or 19 is placed in the keyboard register KB and the remainder of the delay line storage means 20 is up shifted leaving the M3 register position storing all zeros, M1 storing 81 and M2 storing 37. The next instruction character placed in register 13 causes the contents of register positions KB and M1 to be added, placing the resulting sum 100 in the keyboard register KB and shifting the contents of register position M2 (37) to register position M1. The square root instruction character is next placed in the register 13 to cause the square root of the contents of the keyboard register KB to be taken and stored therein (10) without disturbing the remainder of the delay line storage means 20.

The next or eleventh recirculation of the program register 11 introduces the — or subtract instruction character into the register 13. This results in the subtraction of the value 10 in the keyboard register KB from the value 37 stored in the M1 register position leaving the value 27 in the KB register position. A further recirculation of the program register 11 introduces the fourth digit instruction character which permits the entry of the digit 3 from the keying means 24 into the keyboard register KB while causing the value 27 to be down shifted to M1 register position. The ÷ or divide instruction character next introduced into register 13 causes the division of the 27 in the M1 register position by the 3 in the keyboard register position KB leaving the final resultant 9 in the keyboard register position KB from which it is printed out as a result of the fourteenth instruction character or print being executed. The resultant 9 remains in the keyboard register KB position where it may be used for further operations or cleared.

It is thus seen that an electronic computer has been disclosed which utilizes a last-in-first-out delay line storage means and a first-in-first-out program means in conjunction with a manual keyboard and computing means whereby continuing computations may be performed without re-entry of inermediate results.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Computing apparatus comprising processing means for processing data words to produce resultant data words, last-in-first-out storage means for the storage of a plurality of data words and resultant data words, transfer means coupled between said processing means and said storage means for entering resultant data words from said processing means into said storage means, and entry means coupled to said storage means and said processing means for entering data words directly into said storage means and instructions, designating computing steps to be performed by said processing means, directly into said processing means, the entry of an instruction occurring after the direct entry or the storage of all the data and resultant data words to which the instruction is applicable, the entry of said instruction causing the processing means to operate upon one or more stored data and resultant data words so as to perform the computing step designated by the directly entered instruction.

2. Computing apparatus comprising processing means for processing data words to produce resultant data words, last-in-first-out storage means for the storage of a plurality of data words and resultant data words, transfer means coupled between said processing means and said storage means for entering resultant data words from said processing means into said storage means, and entry means coupled to said storage means and said processing means operative by an operator for entering data words directly into said storage means and instructions designating computing steps to be performed by said processing means, directly into said processing means, the entry of an instruction occurring after the direct entry or the storage of all the data and resultant data words to which the instruction is applicable, the entry of said instruction causing the processing means to operate upon one or more stored data and resultant words so as to perform the computing step designated by the directly entered instruction.

3. Computing apparatus comprising processing means for processing data words to produce resultant data words, last-in-first-out storage means for the storage of a plurality of data words and resultant data words, transfer entry means coupled to said storage means and said processing means operative by an operator for entering data words directly into said storage means and instructions designating computing steps to be performed by said processing means directly into the processing means, said entry of an instruction occurring after the direct entry or the storage of all the data and resultant data words to which the instruction is applicable, the entry of said instruction causing the processing means to operate upon one or more stored data words so as to perform the computing step designated by the directly entered instruction, and output means for making the resultant data known to the operator.

4. Computing apparatus comprising computing means for performing computations on numbers to produce resultant numbers, last-in-first-out storage means for the storage of a plurality of numbers and resultant numbers, transfer means coupled between said computing means and said storage means for entering resultant numbers from said computing means into said storage means, manually operated entry means coupled to said storage means and said computing means for entering numbers directly into said storage means and instructions, designating the computing steps to be performed by said computing means, directly into said computing means, the entry of an instruction occurring after the direct entry or the storage of all the numbers and resultant numbers to which the instruction is applicable, the entry of said instruction causing said computing means to operate upon one or more stored numbers and resultant numbers so as to perform the computing step designated by the directly entered instruction, and output means for making the result of a computation known to the operator.

5. Computing apparatus comprising last-in-first-out storage means having a plurality of adjacent storage registers including a keyboard storage register for the storage of a plurality of numbers, computing means coupled to said storage means for performing computations so as one or more numbers stored in said storage means so as to produce a resultant number, transfer means coupled between said computing means and said storage means for entering said resultant number into said keyboard storage register of said storage means manually operated keyboard means coupled to said keyboard storage register of said storage means and said computing means for directly entering a number into said keyboard register of said storage means and instructions, designating the computing steps to be performed by said computing means, directly into said computing means, the entry of and instruction occurring after the direct entry or the storage of all the numbers and resultant numbers to which the instruction is applicable, the entry of said instruction causing said computing means to operate upon one or more stored numbers and resultant numbers depending upon the particular instruction designated, to perform the computation step designated by said directly entered instruction and to store the resultant number in the keyboard register of said storage means, and output means for making the contents of the keyboard register of said storage means known to the operator.

6. Apparatus according to claim 5 wherein one of said stored numbers required by said computing means is obtained from said keyboard register of said storage means and said additional stored numbers, when more than one is required, are obtained from the storage register or registers of said storage means next adjacent to the keyboard register of said storage means.

7. Computing apparatus comprising last-in-first-out storage means having a plurality of adjacent storage registers including a keyboard storage register, for the storage of a plurality of multi-digit numbers, computing means coupled to said storage means for performing computations on one or two numbers stored in said storage means so as to produce a resultant number, transfer means coupled between said computing means and said storage means for entering said resultant number into said keyboard storage register of said storage means, manually operated keyboard means having digit keys for directly entering numbers into said keyboard storage register of said storage means and function keys for directly entering instructions, designating the computing steps to be performed by said computing means, into said computing means, shift means coupled to said storage means, said computing means, and said keyboard means, the operation of a digit key of said keyboard means, representing the first digit of a number, causing the operation of said shaft means to shift the contents of each storage register of said storage means to their next adjacent storage register in a direction away from said keyboard register, leaving said keyboard register in a condition to receive and store said first digit, the operation of further digit keys of said keyboard means, representing succeeding digits of the same multi-digit number, causing said succeeding digits to be combined with said first digit in said keyboard register so as to enter a complete number into said keyboard register, the depression of a function key of said keyboard means, directly causing said computing means to operate upon one or two stored numbers which are obtained from said keyboard register and the next adjacent storage register of said storage means when more than one such number is required, to produce a resultant number, said computing means then causing the operation of said shift means to cause the storage of said resultant number in said keyboard storage register and the shifting of the controls of the storage systems of said storage means, other than said keyboard register, in a direction towards said keyboard register whereby numbers employed in computing said resultant number are removed from said storage means, and output means for making the contents of the keyboard register known to the operator.

8. Computing apparatus comprising last-in-first-out storage means having a plurality of adjacent storage registers including a keyboard storage register, for the storage of a plurality of multi-digit numbers, computing means coupled to said storage means for performing computations on one or more numbers stored in said storage means so as to product a resultant number, transfer means coupled between said computing means and said storage means for entering said resultant number into said keyboard storage register of said storage means, manually operated keyboard means having digit keys for directly entering numbers into said keyboard storage register of said storage means and function keys for directing entering instructions, designating the computing steps to be performed by said computing means, into said computing means, shift means coupled to said storage means, said computing means and said keyboard means; said shift means operative upon the operation of a digit key representing the first digit of a number to shift the contents of each storage register of said storage means to their next adjacent storage register in a direction away from said keyboard register, leaving said keyboard register in a condition to receive and store said first digit, the operation of further digit keys of said keyboard means, representing succeeding digits of the same multi-digit number failing to operate said shift means and causing said succeeding digits to be combined with said first digit in the said keyboard register so as to enter a complete number into said keyboard register, the depression of a function key of said keyboard means directly causing said computing means to operate upon one or more stored numbers which are obtained from said keyboard register and the next adjacent register or registers when more than one such number is required to produce a resultant number, said computing means operating said shift means to store said resultant number in said keyboard register and cause the contents of each register other than said keyboard register to transfer to the next adjacent register in a direction towards said keyboard register wherein said transfer is repeated a plurality of times equal to the quantity of numbers in excess of one required by the instruction, and output means for making the contents of said keyboard register known to the operator.

9. Computing apparatus comprising last-in-first-out storage means having a plurality of adjacent storage registers including a keyboard storage register, for the storage of a plurality of multi-digit numbers, computing means coupled to said storage means for performing computations on one or more numbers so as to produce a resultant number, transfer means coupled between said computing means and said storage means for entering said resultant number into said keyboard storage register of said storage means, manually operated keyboard means having digit keys for directly entering numbers into said keyboard storage register of said storage means and function keys for directing entering instructions, designating the computing steps to be performed by said computing means, into said computing means, shift means, including a bistable element, coupled to said storage means, said computing means and said keyboard means, said shift means being operative, when said bistable element is in a first stable condition, upon the operation of a digit key representing the first digit of a number to shift the contents of each storage register of said storage means to their next adjacent storage register in a direction away from said keyboard register, leaving said keyboard register in a condition to receive and store said first digit, the storage of said first digit in said keyboard register causing said bistable element to be set to a second stable condition permitting any additional digits of said multi-digit number to be combined with said first digit in said keyboard register to provide the complete number in said keyboard register while preventing the further shifting of the contents of the storage registers of said storage means, the depression of a function key of said keyboard means directly causing said computing means to operate upon one or more stored numbers which are obtained from said keyboard register and the next adjacent register or registers when more than one such number is required to produce a resultant number, said computing means operating said shift means to store said resultant number in said keyboard register and cause the contents of each register, other than said keyboard register to transfer to the next adjacent register in a direction towards said keyboard register wherein said transfer is repeated a plurality of times equal to the quantity of numbers in excess of one required by the instruction, and even further causes the bistable element to change to said first condition, and output means for making the contents of said keyboard register known to the operator.

10. Computing apparatus comprising processing means for processing data words to produce resultant data words, last-in-first-out storage means for the storage of a plurality of data words and resultant data words, transfer means coupled between said processing means and said storage means for entering resultant data words from said processing means into said storage means, entry means coupled to said storage means and said processing means for entering data words directly into said storage means and instructions, designating computing steps to be performed by said processing means, directly into said processing means, the entry of an instruction occurring after the direct entry or the storage of all the data and resultant data words to which the instruction is applicable, the entry of said instruction causing said processing means to operate upon one or more stored data and resultant data words so as to perform the computing step designated by the directly entered instruction, and program means including a mode selector means and first-in-first-out program storage means interconnected with said mode selector means and said entry means, said program storage means storing a record of the order of entry of instructions by said entry means whereby the record is formed as instructions are entered into said processing means when said mode selector means is in a first position, and whereby said program storage means operates in lieu of said entry means to provide instructions for controlling said processing means while data words continue to be entered from said entry means when said mode selector means is in a second position, said program storage means supplying instructions to said processing means in the same order as those entered when said mode selector means was in said first position.

11. Computing apparatus comprising processing means for processing data words to produce resultant data words, last-in-first-out storage means for the storage of a plurality of data words and resultant data words, transfer means coupled between said processing means and said storage means for entering resultant data words from said processing means into said storage means, entry means coupled to said storage means and said processing means for entering data words directly into said storage means and instructions, designating computing steps to be performed by said processing means, directly into said processing means, the entry of an instruction occurring after the direct entry or the storage of all the data and resultant data words to which the instruction is applicable, the entry of said instruction causing said processing means to operate upon one or more stored data and resultant data words so as to perform the computation step designated by the directly entered instruction, and program means including a mode selector means and first-in-first-out program storage means interconnected with said mode selector means and said entry means, said program storage means storing a record of the order of entry of data words and instructions by said entry means whereby the record is formed as data words and instructions are entered into said last-in-first-out storage means and processing means respectively when said mode selector means is in a first position, and whereby said program storage means operates in lieu of said entry means to provide instructions for controlling said processing means while data words continue to be entered from said entry means when said mode selector means is in a second position, said program storage means supplying instructions to said processing means in the same order as those entered when said mode selector means was in said first position.

12. An electronic computer comprising program apparatus and computing apparatus having manually operated keyboard means having digit keys representative of digits for entering numbers and function keys for entering instructions in a parenthesis-free notation, computing means for performing computations, first storage means having a plurality of storage areas including a keyboard storage area, said areas storring numbers and resultant numbers therein, said storage areas being coupled to said computing means for transferring thereto numbers and receiving from said computing means resultant numbers, said keyboard storage area further being coupled to said keyboard means for storing numbers entered by said digit keys; shift means coupled to said keyboard means, said computing means and said first storage means, the activation of a keyboard function key causing numbers from said keyboard storage area and the adjacent storage area of said first storage means to be transferred to said computing means, under the control of said shift means, to be operated upon by said computing means, the resultant number being transferred to said keyboard storage area and the numbers in all other storage areas being shifted toward said keyboard storage area, said transfer to the keyboard storage area and the shifting of said first storage means being under control of said shift means, the entry of a number by said digit keys causing all numbers stored in the storage areas of said first storage means to shift from their present storage areas to the next storage area in a direction away from said keyboard storage area and causing the entered number to be then stored in said keyboard area, said shifting and number entry being under the control of said shift means operated in response to said digit keys, the aforementioned program apparatus having mode selector means for selecting between at least two modes of operation and settable bistable elements for controlling said computing means regardless of said mode selector means position whereby the operation of a function key or the first digit key of a number causes a code unique for each function key and for any first digit key to be set into said settable bistable elements when said mode selector means is in a first position, a second storage means having a plurality of storage positions sufficient to store a plurality of instruction codes and which is operatively connected to said mode selector means and said bistable element means to permit the contents of said storage register to be connected at the appropriate time to said bistable elements such that the second storage means stores the code contained in said bistable elements when said mode selector means is in said first mode position and causes said shift means to cyclically shift and emit codes to said bistable elements while in the second mode position, wherein the storage and emission of codes is on a first-in-first-out basis.

13. In a computer having computing means a program apparatus comprising a mode selector means, keyboard means having digit and function keys coupled to said mode selector means and said computing means for entering numbers and instructions into said computing means whereby the entered instructions control said computing means when said mode selector means is in a first position, and first-in-first-out storage means coupled to said mode selector means and said keyboard means for storing a record of the order of entry of instructions by said keyboard means whereby said record is formed as said instructions are entered into said computing means when the mode selector means is in said first position, and whereby the said storage means operates in lieu of the keyboard function keys for controlling said computing means while numbers continue to be entered from said keyboard digit keys when said mode selector means is in a second position so as to supply instructions to said computing means in the same order as those entered when said mode selector means was in said first position.

14. In a computer having a computing means a program apparatus comprising a mode selector means, keyboard means having digit and function keys coupled to said mode selector means and said computing means for entering numbers and instructions into said computing means whereby the entered instructions control said computing means when said mode selector means is in a first position, and first-in-first-out storage means coupled to said mode selector means and said keyboard means for storing a record of the order of entry of numbers and instructions by said keyboard means whereby said record is formed as the numbers and instructions are entered into said computing means when said mode selector means is in a first position, and whereby the said storage means operates in lieu of said keyboard function keys for controlling said computing means while numbers continue to be entered from said keyboard digit keys when said mode selector is in a second position so as to supply instructions to said computing means in the same order as those entered when said mode selector means was in said first position.

15. In a computer having a computing means a program apparatus comprising a three position mode selector means, keyboard means having digit and function keys coupled to said mode selector means and said computing means for entering numbers and instructions into said computing means whereby the entered instructions control said computing means when said mode selector means is in either a first or second position, and first-in-first-out storage means coupled to said mode selector means and said keyboard means for storing a record of the order of entry of numbers and instructions by said keyboard means whereby said record is formed as the numbers and instructions are entered into said computing means when said mode selector means is in said second position, and whereby said storage means operates in lieu of said keyboard function keys for controlling said computing means while numbers continue to be entered from said keyboard digit keys when said mode selector means is in a third position so as to supply instructions to said computing means in the same order as those entered when said mode selector means was in said second position.

16. In a computer having a computing means a program apparatus comprising a first means having a manually positioned three-position mode switch, second means including a group of settable bistable elements which control said computing means regardless of said mode switch position, keyboard means including digit keys and function keys coupled to said first and second mentioned means whereby the operation of a function key or the first digit key of a number causes a code unique for each function key and for any first digit key to be set into said settable bistable elements when said mode switch is in either the first or second position, and a first-in-first-out storage register means having a capacity sufficient to store a plurality of instruction codes, said storage register means coupled to said first and second mentioned means whereby the contents of said storage register remain unchanged when said mode switch is in said first position and whereby said storage register is connected at the appropriate time to said bistable elements while in the other two mode switch positions said storage register stores the code contained in said bistable elements while in said second mode position and cyclically shifts and emits codes to said bistable elements while in the third mode position, wherein the storage and emission of codes is on a first-in-first-out basis.

17. A computing system for computing according to mathematical expressions employing basic computing procedures, comprising a computing device for computing upon operands according to predetermined instructions to produce intermediate or final results; last-in-first-out storage means having a number of sections, each section adapted to store an operand or an intermediate result, said sections being arranged in a straight line so that the contents of each section can be transmitted only to the next adjacent section at each side; said storage means coupled to said computing device; keyboard means coupled to said storage means and said computing device, said keyboard means having digit keys for entering operands directly into said storage means and function keys for entering instructions directly into said computing device; shifting means coupled to said keyboard means, said storage means and said computing device; the depression of a digit key causing the operation of said shifting means to cause the shifting of stored operands or intermediate results in a direction away from a first section of said storage means and then causing the entry of an operand into said first section; the depression of one of said function keys causing the shifting of said storage means to present one or more stored operands or intermediate results to said computing device and causing the computing device to perform the mathematical operation called for by the function key on the operand stored in said first section of said storage means as well as on other operands in the next adjacent sections of said storage means when more than one operand is required, the depressing of a function key further causing the storing of the result of such a mathematical operation in said first section of said storage means whereby one of the operands is replaced and can then be utilized as an intermediate result for further computations, and it further causes the remaining contents of said storage means which were not utilized for the mathematical operation, to be shifted through one or more sections in the direction of the first section of said storage means whereby the number of the sections through which said contents are shifted is equal to the number of operands required beyond one operand to thereby cause the remaining operands of said mathematical operation to be replaced by previously entered operands or intermediate results.

18. Computing apparatus comprising: computing for computing upon operands in accordance with predetermined instructions and producing intermediate or final results; last-in-first-out storage means having a plurality of sections, each section capable of storing an operand, and intermediate or final result, each of said sections capable of transferring its contents to the next adjacent sections; first coupling means coupling said storage means to said computing device to transfer operands, intermediate or final results therebetween; first-in-first-out program storage means having a plurality of sections for storing instructions, each of said sections capable of transferring its contents to the next adjacent section; second coupling means coupling said program storage to said computing device; keyboard means, coupled to said storage means, said computing device and said program storage means; said keyboard means having digit keys for entering operands directly into said storage means and function keys for entering instructions directly into said program storage means and said computing device, said function keys being depressed only after all of said operands, intermediate of final results to which said instruction pertains have been stored in said storage means whereby said instruction is executed by said computing device and stored in said program storage means for controlling said computing device during other computing operations.

References Cited

UNITED STATES PATENTS

| | | | |
|---|---|---|---|
| 3,047,228 | 7/1962 | Bauer et al. | 235—157 |
| 3,234,524 | 2/1966 | Roth | 340—172.5 |

ROBERT C. BAILEY, *Primary Examiner.*

R. M. RICKERT, *Assistant Examiner.*